L. PRICE.
Attachment for Plows.

No. 224,223.        Patented Feb. 3, 1880.

Witnesses:
P. C. Dietrich
Jno. H. Stockman

Inventor
Levi Price
Per C. H. Watson & Co.
Attorneys.

UNITED STATES PATENT OFFICE.

LEVI PRICE, OF CRESTON, ILLINOIS.

ATTACHMENT FOR PLOWS.

SPECIFICATION forming part of Letters Patent No. 224,223, dated February 3, 1880.

Application filed December 5, 1879.

*To all whom it may concern:*

Be it known that I, LEVI PRICE, of Creston, in the county of Ogle and State of Illinois, have invented certain new and useful Improvements in Attachments for Plows; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to an improved attachment to plows for the purpose of removing corn-stubble, clods, and other obstructions from corn-rows in cultivating. It may also be used for removing such obstructions from the shields which are frequently used in cultivating, or from plows or cultivator-teeth.

When attached to a cultivator it is to be attached to the right-hand beam and project inward nearly or quite to the corn-row; and its nature consists in providing the device with a disk-plate adjustable toward or from the plow or cultivator beam, and in providing a disk-plate with an adjustable tooth-socket and an adjustable spring-tooth, as hereinafter more fully set forth and described.

Figure 1:
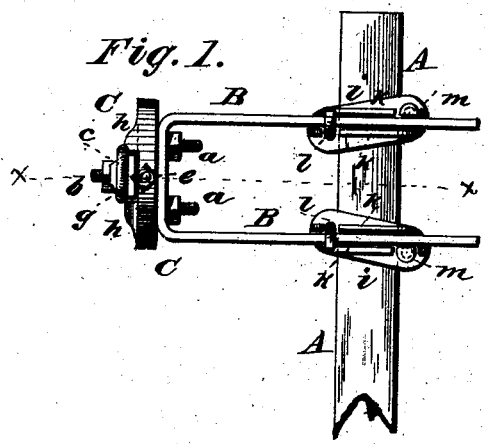
Figure 2:
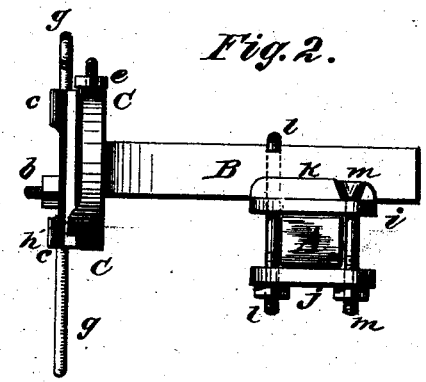
Figure 3:
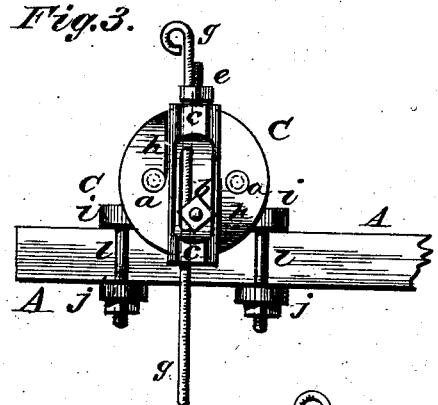
Figure 4:
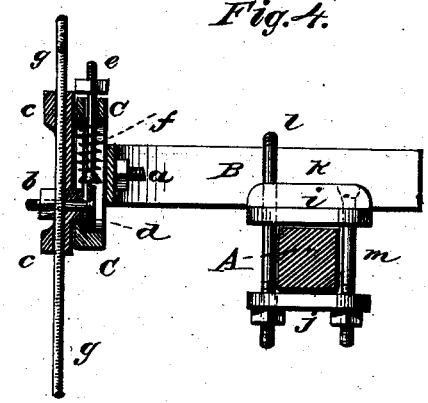
Figure 5:
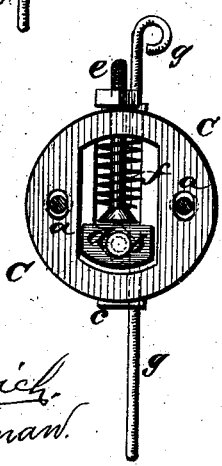
Figure 6:
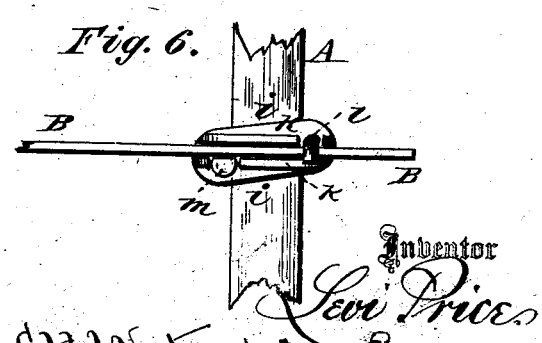

In the annexed drawings, Figure 1 is a top or plan view. Fig. 2 is a side elevation of the attachment; Fig. 3, an end view; Fig. 4, a section on line $x$ $x$ of Fig. 1; Fig. 5, a reverse view of the disk detached, and Fig. 6 a top or plan view of the clip.

A indicates a section of cultivator or plow beam; B, the bed-plate to which the disk is attached; C, the disk; $a$, bolts by which the disk is attached to the plate B; $b$, bolt by which the standard-socket is held to the disk; $c$, standard-socket; $d$, plate working in the slot of the disk C; $e$, screw for holding the spring in place above the plate $d$; $f$, the supporting-spring; $g$, the spring-tooth; $h$, projections on the face of the disk C for supporting the strain of the tooth and socket $c$; $i$ $j$, clip-plates; $k$, fins or projections on the clip-plate $i$; $l$ $m$, clip-bolts, one or both of which are made with hooked heads for clamping and holding the bent bar B.

The beam A is of any ordinary construction, as my device is applicable to any of the forms of beams in use. The bar B is easily made by bending an ordinary flat bar of iron into the form shown in Fig. 1. The disk C and socket $c$ are preferably made of cast-iron in the form shown.

The disk C is provided vertically across its center with a slot having ledges or projections for holding the plate $d$ in place, as shown at Fig. 5.

The tooth $g$ is a light spring-tooth made of steel. In the form shown it is straight at the point; but it may be given any desired curve or form.

The clip is made in the ordinary form, except that the upper plate, $i$, is provided with two flanges or fins, $k$, which form a socket into which the arms B fit. They are held in place by the bolt $l$, which serves the double purpose, by reason of its hooked head, of locking the clip and supporting and holding the plate B. The bolt $m$ may also be hooked in like manner, if desired.

The flanges $k$ are placed at an angle, in order that they may fit the plate B and allow said plate or its arms to pass between the clip-bolts, so that one bolt will be on each side of both of said arms.

It will be obvious that this attachment may be attached to the lower side of the beam instead of the upper, as shown.

Having thus fully described my invention, what I claim as new, and desire to secure by Letters Patent, is—

1. The slotted disk C, in combination with plate $d$, socket $c$, spring $f$, and bolt $e$, substantially as and for the purpose set forth.

2. The spring-tooth $g$, socket $c$, and plate $d$, in combination with the shoulders $h$ of the disk C, spring $f$, and bolt $e$, substantially as and for the purposes set forth.

In testimony that I claim the foregoing as my own I have hereto affixed my signature in presence of two witnesses.

LEVI PRICE.

Witnesses:
ALVIN COUNTRYMAN,
JENNIE E. COUNTRYMAN.